(12) United States Patent
Kwon et al.

(10) Patent No.: US 7,920,666 B2
(45) Date of Patent: Apr. 5, 2011

(54) SAFETY INJECTION TANK WITH GRAVITY DRIVEN FLUIDIC DEVICE

(75) Inventors: Tae-Soon Kwon, Seo-gu (KR); In-Chul Chu, Yuseong-gu (KR); Chul-Hwa Song, Seo-gu (KR); Won-Pil Baek, Yuseong-gu (KR)

(73) Assignees: Korea Atomic Energy Research Institute, Daejeon (KR); Korea Hydro and Power Co., Ltd., Seoul (KR)

( * ) Notice: Subject to any disclaimer, the term of this patent is extended or adjusted under 35 U.S.C. 154(b) by 269 days.

(21) Appl. No.: 12/128,009

(22) Filed: May 28, 2008

(65) Prior Publication Data

US 2009/0279657 A1 Nov. 12, 2009

(30) Foreign Application Priority Data

May 8, 2008 (KR) ........................ 10-2008-0043042

(51) Int. Cl.
*G21C 9/00* (2006.01)

(52) U.S. Cl. ........................ 376/282; 376/283; 376/277

(58) Field of Classification Search .................. 376/282, 376/283, 277
See application file for complete search history.

(56) References Cited

FOREIGN PATENT DOCUMENTS

| JP | 1992-328494 | 11/1992 |
|---|---|---|
| KR | 10-0402750 | 1/2000 |
| KR | 10-0369247 | 11/2000 |
| KR | 10-0556288 | 1/2005 |

*Primary Examiner* — Rick Palabrica

(74) *Attorney, Agent, or Firm* — Merchant & Gould P.C.

(57) ABSTRACT

A safety injection tank, used for quickly injecting emergency core cooling water (ECCW) to a reactor vessel in the case of a cold leg large break accident (CLLBA) in a pressurized water reactor (PWR), is disclosed. The safety injection tank has a gravity-driven fluidic device configured to efficiently change the ECCW injection mode from a high flow injection mode to a low flow injection mode. The gravity-driven fluidic device includes a spring placed in the upper end of the vertical pipe, and a vertically movable water tub placed on the spring so as to be movable in a vertical direction. When ECCW contained in the pressure vessel is discharged and the water level is reduced lower than the height of the tub, the tub is moved downwards such that the lower surface thereof comes into contact with the vertical pipe and closes the high flow inlet port.

12 Claims, 14 Drawing Sheets

(a) (b) (c)

PRIOR ART

PRIOR ART

PRIOR ART

SAFETY INJECTION TANK WITH GRAVITY DRIVEN FLUIDIC DEVICE

BACKGROUND OF THE INVENTION

1. Field of the Invention

The present invention relates, in general, to a safety injection tank used for quickly injecting emergency core cooling water (ECCW) to a reactor vessel in the case of a cold leg large break accident (CLLBA) in a pressurized water reactor (PWR) and, more particularly, to a technique related to a fluidic device configured to efficiently execute the transition of ECCW injection mode from a high flow injection mode in an early stage of the CLLBA to a low flow injection mode in a latter stage of the CLLBA. Particularly, the present invention relates to a technique of executing the transition of ECCW injection mode from a high flow injection mode to a low flow injection mode using a gravity-driven fluidic device, installed in the safety injection tank, as time goes by after operation of the safety injection tank.

2. Description of the Related Art

Pressurized water reactors (PWR) must be designed, constructed and operated according to rigid safety standards and, particularly, an emergency core cooling water injection system (ECCWIS), provided against a large break loss-of-coolant accident (LBLOCA) caused by a cold leg break accident (CLBA), is estimated as an important device in a reactor cooling system.

The present invention relates to a safety injection tank, which is a vessel constituting the emergency core cooling water injection system (ECCWIS) and is used for storing the emergency core cooling water (ECCW) therein. Nitrogen gas is charged in an empty upper space in the safety injection tank, so that the safety injection tank can passively inject the ECCW to a reactor system due to a pressure difference.

When a large break loss-of-coolant accident (LBLOCA), in which the safety injection tank must be operated, occurs in a reactor system, it is necessary for the safety injection tank to inject a high flow of ECCW into the reactor system in an early stage of the LBLOCA and to inject a low flow of ECCW in the latter stage of the LBLOCA. In the early stage of the LBLOCA, in which the reactor core is exposed, the ECCW must be quickly injected by the discharge of the high flow of ECCW from the tank, but in the latter stage of the LBLOCA, in which a substantial amount of ECCW has been charged in the reactor system and reaches a predetermined water level, it is required for the safety injection tank to discharge only a low flow of ECCW so as to compensate for lost ECCW, which has been lost to the outside of the reactor core.

A conventional vortex type fluidic device, used in the safety injection tank, uses a method of flow mode transition from the high flow injection mode to the low flow injection mode using a height difference between the height of an inlet port provided in the upper end of a vertical pipe and a water level in the safety injection tank.

FIG. 1 shows a safety injection tank disclosed in Korean Patent No. 369247. As shown in (a) of FIG. 1, during a high flow injection mode, in which the water level in the safety injection tank 10 is higher than the height of a supply line inlet port 20, the emergency core cooling water flows into both the supply line inlet port 20 and a control line inlet port 30, passes through a supply line 21 and a control line 31 and meets together at portions around the inner circumference of a vortex chamber 55, and flows inwards in radial directions in the vortex chamber 55 prior to being discharged from the vortex chamber 55 through a drain port. Meanwhile, as shown in (b) of FIG. 1, during a low flow injection mode, in which the water level in the safety injection tank 10 is lower than the height of the supply line inlet port 20, the emergency core cooling water cannot flow into the supply line inlet port 20, but the emergency core cooling water flows into only the control line inlet port 30 and is discharged from the vortex chamber 55 through the drain port while forming a strong vortex in the chamber 55.

However, the fluidic device disclosed in the Korean Patent No. 369247 is problematic in that the device has a complicated inner structure, as shown in the cross-sectional views of (a) and (b) of FIG. 1, and the characteristics thereof may be easily changed according to a change in the swirling direction of the vortex, a surface area ratio and a relative angle between respective discharge lines, so that it is very difficult to estimate the characteristics of a turndown ratio using the surface area ratio between the high flow inlet port and the low flow inlet port. To design a stable fluidic device capable of efficiently responding to desired characteristics of a reactor system, it should be required to estimate a turndown ratio between the maximum flow rate and the minimum flow rate according to a simple flow area ratio. However, the fluidic device shown in FIG. 1 cannot efficiently estimate the turndown ratio between the maximum and minimum flow rates.

Another problem of the fluidic device shown in FIG. 1 resides in that the large flow supply line inlet port 20 is exposed to the nitrogen gas in the safety injection tank 10 during a low flow injection mode, as shown in FIG. 2 schematically illustrating both a turndown point and a time to early inject the nitrogen gas when the injected flow rate is changed from a high flow rate to a low flow rate, so that an early injection of nitrogen gas, in which the nitrogen gas is early injected into the reactor system along with the emergency core cooling water, may occur during the low flow injection mode. When the nitrogen gas is early injected into the reactor system as described above, the nitrogen gas may disturb condensation of steam in the reactor system and reduces the precision of thermal hydraulic analysis of the reactor system, thus causing some problems in the reactor system.

In addition to Korean Patent No. 369247 shown in FIG. 1 of the accompanying drawings, another example of conventional safety injection tank may be referred to Korean Patent No. 402750 and Japanese Patent Application laid-open Publication No. Hei 4-328494. However, each of the above-mentioned prior art safety injection tanks has a structure, which cannot avoid the early injection of nitrogen gas.

In an effort to prevent the early injection of nitrogen gas, a technique of closing the inlet port provided in the uppermost end of a vertical pipe 20 of the fluidic device using a buoyant plate 50 is disclosed in Korean Patent No. 556288 (see FIG. 3). Typically, materials with low specific weight have been used as the material, which can float in a boric acid solution of high boric acid content charged in the safety injection tank. However, the buoyant plate made of a material with low specific weight is almost impossible to cope with a desired life soundness, which requires the buoyant plate to endure without damage for 40-60 years that are the typical life spans of nuclear power plates. Further, when the fluidic device is continuously kept in a standby state without being operated for a lengthy period of time, the buoyant plate may be fixed to the inlet port of the vertical pipe and fails to start its operation, so that it is very difficult to use the buoyant plate in a practical safety injection tank.

SUMMARY OF THE INVENTION

Accordingly, the present invention has been made keeping in mind the above problems occurring in the related art, and the present invention is intended to provide a safety injection tank with a gravity-driven fluidic device, in which the fluidic device is embodied to realize a simple device, thus easily estimating a turndown ratio at a turndown point, at which the high flow injection mode is changed to the low flow injection mode, and, at the same time, the early injection of nitrogen gas can be completely prevented.

In a conventional fluidic device, the turndown ratio (TDR) cannot be determined using a diameter ratio between the high flow inlet port and the low flow inlet port because a plurality of factors, such as the swirling strength of a vortex, a surface area ratio and relative angles between respective flow lines of the fluidic device, which may control the turndown ratio, is present in the fluidic device. However, the present invention can easily determine the turndown ratio using a diameter ratio between the high flow inlet port and the low flow inlet port, so that it is easy to design the turndown ratio of the fluidic device, etc.

Further, the present invention is intended to provide a safety injection tank with a fluidic device, in which the inlet port defined in the upper end of the vertical pipe can be completely passively opened and closed by an appropriate combination of a buoyant force, a vertical weight of a vertically movable water tub and a restoring force of a spring, unlike a conventional technique, in which the vertical pipe of a conventional fluidic device has an open inlet port and the open inlet port is controlled using only a buoyant plate, thus easily causing an early injection of nitrogen gas, in which nitrogen gas is early injected into the open inlet port of the vertical pipe and is discharged outside the safety injection tank.

Further, unlike the conventional safety injection tank, which has no downward discharge line in a lower hemispherical surface thereof, so that the emergency core cooling water, collected in the safety injection tank to reach a level lower than the upper surface of the fluidic device, cannot be discharged outside the safety injection tank, but remains in the tank (see FIG. 1), the present invention is intended to provide a safety injection tank, in which a low flow inlet port is located at a position around the lower hemispherical surface of the safety injection tank, thus completely discharging the emergency core cooling water, collected in the low hemispherical surface in the safety injection tank, to the outside of the safety injection tank and increasing the effective volume of discharged emergency core cooling water capable of cooling a reactor core, thereby solving the problems of a conventional safety injection tank.

In order to achieve the above objects, according to one aspect of the present invention, there is provided a safety injection tank, in which the conventional fluidic device is removed from the lower portion of the safety injection tank and a low flow inlet port is located in a wall surface of a discharge nozzle placed near the lower hemispherical surface of the safety injection tank, and a high flow inlet port is located in the upper end of a vertical pipe, so that the safety injection tank has a simple structure capable of efficiently determining a turndown ratio using a flow area ratio between the high flow inlet port and the low flow inlet port.

The simplified turndown ratio is described by the following relational expression.

$$d^2 = \frac{1}{N} \times \frac{1}{TDR} \times (D^2 + Nd^2)$$

where d is a diameter of the low flow inlet port, N is the number of low flow inlet ports, TDR is a turndown ratio between the high flow rate and the low flow rate, and D is a diameter of the high flow inlet port. Therefore, when assuming that the high flow inlet port and the low flow inlet port are designed to have similar flow conditions, the turndown ratio can be easily determined using the diameter D of the vertical pipe corresponding to the high flow inlet port, the number N of low flow inlet ports and the diameter d of the low flow inlet port.

In the present invention, the safety injection tank is configured such that the flow mode transition from the high flow injection mode to the low flow injection mode can be realized by arranging a gravity-driven fluidic device so as to close the upper end of the vertical pipe, which functions as the high flow inlet port. The gravity-driven fluidic device of the present invention includes a spring-biased vertically movable water tub. When the safety injection tank is operated and the water level in the safety injection tank is gradually reduced, the balance of buoyant forces acting inside and outside the spring-biased vertically movable water tub placed on the vertical pipe is broken. Thus, a vertical load, which is increased by the weight of emergency core cooling water contained in the vertically movable water tub, overcomes the restoring force of the spring, so that the lower surface of the vertically movable water tub comes into close contact with the high flow inlet port defined in the upper end of the vertical pipe, thereby closing the high flow inlet port.

Unlike a conventional fluidic device, in which the vertical pipe is maintained in an open state in the case of a low flow injection mode, the gravity-driven fluidic device of the present invention is configured such that, according to a difference between the vertical load, which varies according to a water level difference between the inside and outside of the vertically movable water tub, and a restoring force of the spring, the high flow inlet port can be maintained in an open state during a high flow injection mode, but the lower surface of the vertically movable water tub comes into close contact with the high flow inlet port and closes the high flow inlet port after the high flow injection mode is changed to the low flow injection mode, thus causing the emergency core cooling water to be discharged through only the low flow inlet port formed in the lower portion of the safety injection tank. Therefore, during operation of the safety injection tank, the gravity-driven fluidic device can prevent discharge of nitrogen gas until the safety injection tank is emptied.

Further, when the emergency core cooling water, contained in the vertically movable water tub, has been completely discharged from the tub through a small-sized drain port formed in the sidewall of the vertically movable water tub, the increase in the vertical load, which has been increased by the weight of water acting on the spring, is removed, so that the spring elastically lifts the vertically movable water tub upwards, thus reopening the high flow inlet port. Therefore, it is possible to prevent a plastic deformation or a reduction in elasticity of the spring, which may be occurred when the vertically movable water tub containing water therein presses the spring downwards for a lengthy period of time.

To allow the vertically movable water tub to be passively moved upwards and downwards according to a difference between buoyant forces acting inside and outside the tub as described above, the relationship between the maximum displacement of the vertically movable water tub, the weight of the vertically movable water tub, the weight of emergency core cooling water contained in the vertically movable water tub, and the spring constant of the spring must be described by the following relational expression.

$$\frac{W_T}{H_S} \le k \le \frac{W_w + W_T}{y^* + \frac{1}{2}H_S}$$

where $W_w$ is the weight of emergency core cooling water contained in the vertically movable water tub, $W_T$ is the weight of the vertically movable water tub, k is a spring constant of the spring, $H_S$ is a vertical thickness of the spring, and $y^*$ is a vertical spacing distance of the vertically movable water tub. In other words, as expressed by the above expression, the spring constant of the spring must be determined such that the spring can lift the vertically movable water tub upwards when the tub is in an empty state and can allow the vertically movable water tub containing the water therein to be moved downwards by the vertical spacing distance. If a plurality of springs is installed, the sum of the spring constants of the springs is used as the spring constant k in the above relational expression.

A guide cylinder may be placed outside the vertically movable water tub in a state in which the guide cylinder surrounds the tub. The guide cylinder functions to prevent the vertically movable water tub from being played on a plane perpendicular to the vertical moving direction of the tub. The guide cylinder is provided with a plurality of through holes, which functions as a flow path from the outside of the guide cylinder to the high flow inlet port of the vertical pipe. Here, the total flow area of the through holes must be determined as a substantially large area capable of allowing a large flow of emergency core cooling water to be injected from the outside of the guide cylinder into the high flow inlet port of the vertical pipe through the through holes. For example, the total flow area of the through holes, which are formed in the guide cylinder within a range corresponding to the vertical spacing distance $y^*$ of the vertically movable water tub, must be determined as 1.2~1.5 times the flow area of the high flow inlet port.

The design values of the gravity-driven fluidic device according to the present invention may be determined based on the inner diameter D of the vertical pipe, which acts as a high flow inlet port. First, the vertical spacing distance $y^*$ of the vertically movable water tub is preferably determined to be included within a range of 0.5~1.0 times the diameter D such that the vertically movable water tub can close the upper end of the vertical pipe within an appropriate time period in response to a reduction in the water level inside the safety injection tank. The time to be required to change the flow mode is reduced in proportion to the vertical spacing distance $y^*$ of the vertically movable water tub. Further, the outer diameter $OD_w$ of the vertically movable water tub is preferably determined as 1.5 times the diameter D, the height $H_w$ of the vertically movable water tub is preferably determined as 1.5~2.0 times the diameter D, and the inner diameter $ID_c$ of the guide cylinder is preferably determined as 1.6 times the diameter D.

The safety injection tank having the above-mentioned gravity-driven fluidic device according to the present invention is advantageous as follows. Unlike a conventional fluidic device, in which the inlet port of the vertical pipe has an open structure, so that nitrogen gas may be early injected through the open inlet port of the vertical pipe and discharged outside the safety injection tank, the upper open port of the vertical pipe of the gravity-driven fluidic device according to the present invention is configured to be selectively opened or closed both by the vertical weight of the vertically movable water tub and the restoring force of the spring, so that the gravity-driven fluidic device can prevent an early injection of nitrogen gas. Thus, the safety injection tank having the gravity-driven fluidic device according to the present invention is advantageous in that it is possible to easily control the turndown ratio of the emergency core cooling water, which is required to design a reactor system provided against a large break loss-of-coolant accident (LBLOCA), and it is possible to prevent an early injection of nitrogen gas.

Further, unlike the conventional fluidic device, in which a downward discharge flow path is not formed in the lower hemispherical surface, so that the emergency core cooling water contained in the fluidic device at a portion below the upper surface of the fluidic device cannot be discharged from the safety injection tank, the safety injection tank of the present invention is provided with a low flow inlet port at a location around the lower hemispherical surface, thus completely discharging the emergency core cooling water contained in the fluidic device at a portion below the lower hemispherical surface. Therefore, the present invention can increase the effective volume of discharged emergency core cooling water used for cooling a nuclear reactor. Thus, the present invention increases low flow injection time and retards the reduction in the core cooling water level for the nuclear reactor. When the reduction in the core cooling water level is prevented during the low flow injection time period (during LBLOCA reflood phase), it is possible to prevent a quick increase in the core temperature of a nuclear reactor, thus improving the safety of the nuclear reactor.

BRIEF DESCRIPTION OF THE DRAWINGS

The above and other objects, features and other advantages of the present invention will be more clearly understood from the following detailed description when taken in conjunction with the accompanying drawings, in which.

Figure 1:
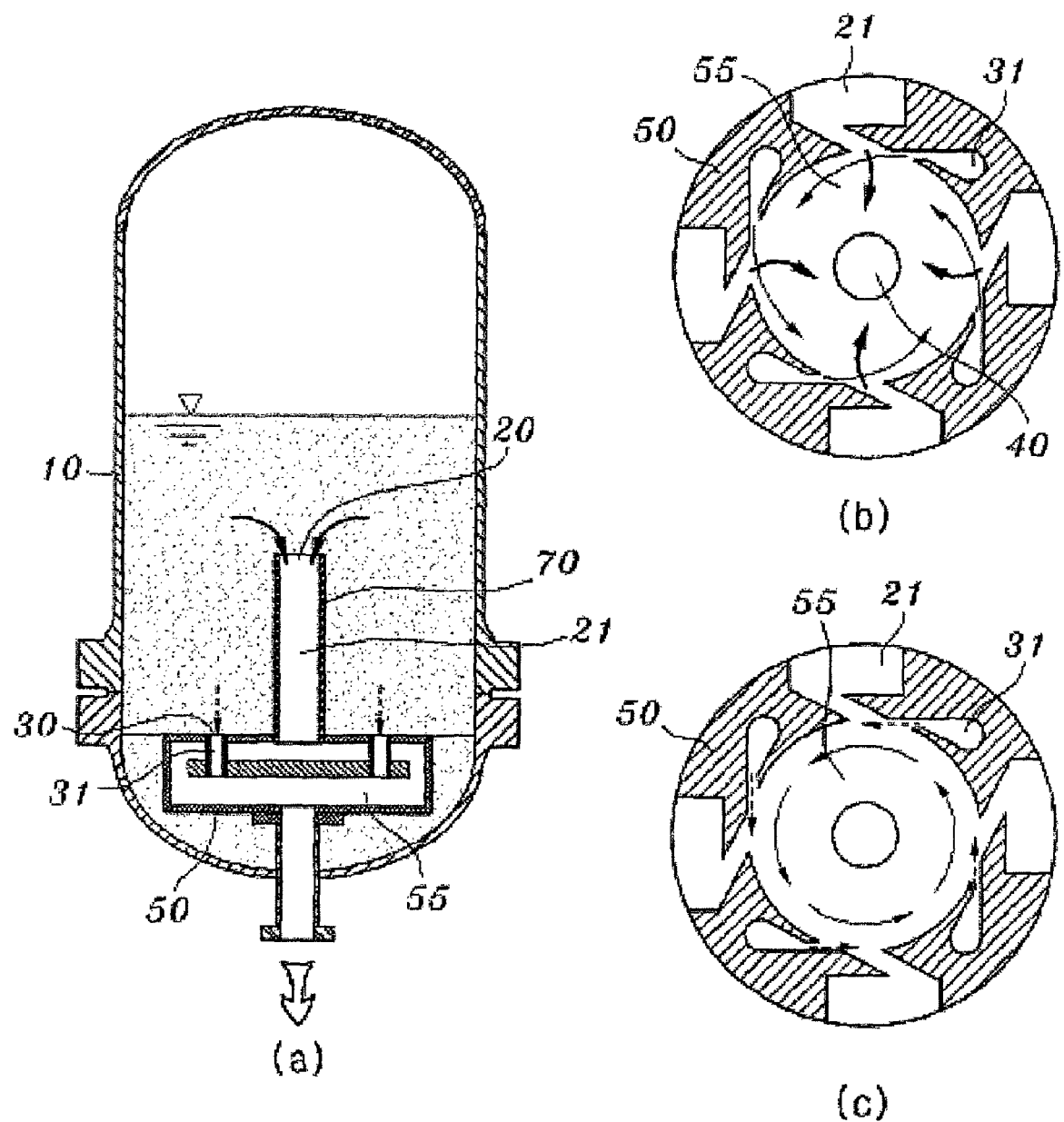
FIG. 1 is a view schematically illustrating the longitudinal cross-section of a vortex type fluidic device used in a conventional safety injection tank disclosed in Korean Patent No. 369247, a vortex swirling direction in the case of a high flow injection (a) and a vortex swirling direction in the case of a low flow injection (b)
Figure 2:
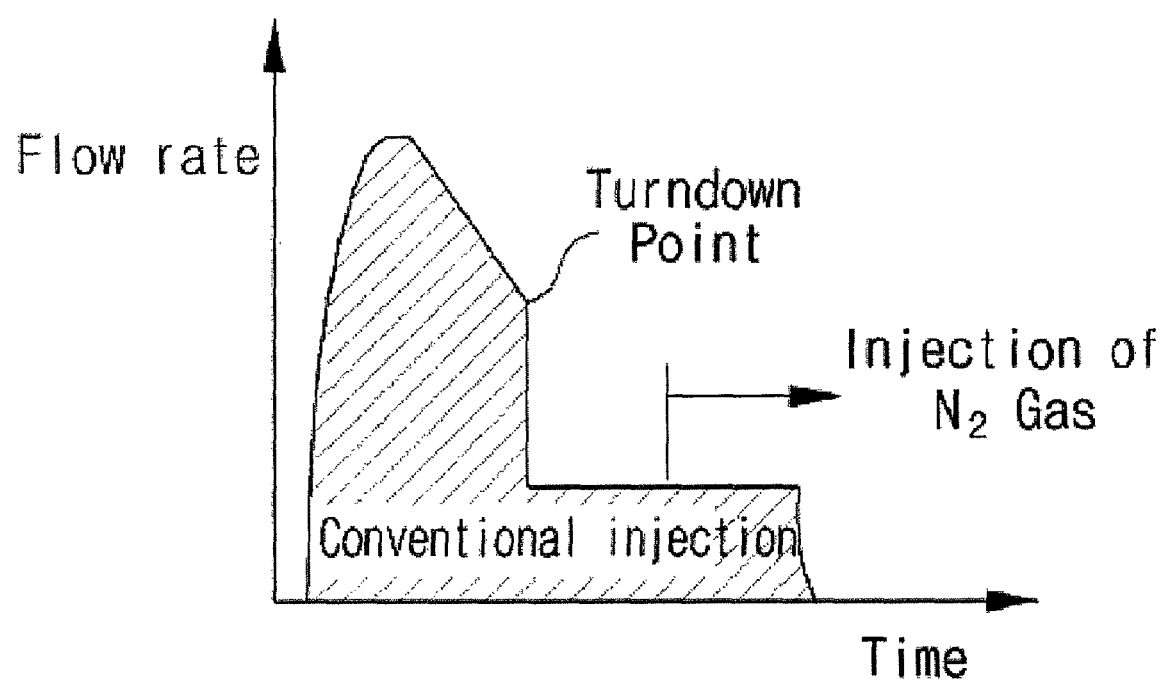
FIG. 2 is a diagram schematically illustrating the flow characteristics and the time to early inject nitrogen gas into the vortex type fluidic device provided in the conventional safety injection tank shown in FIG. 1.
Figure 3:
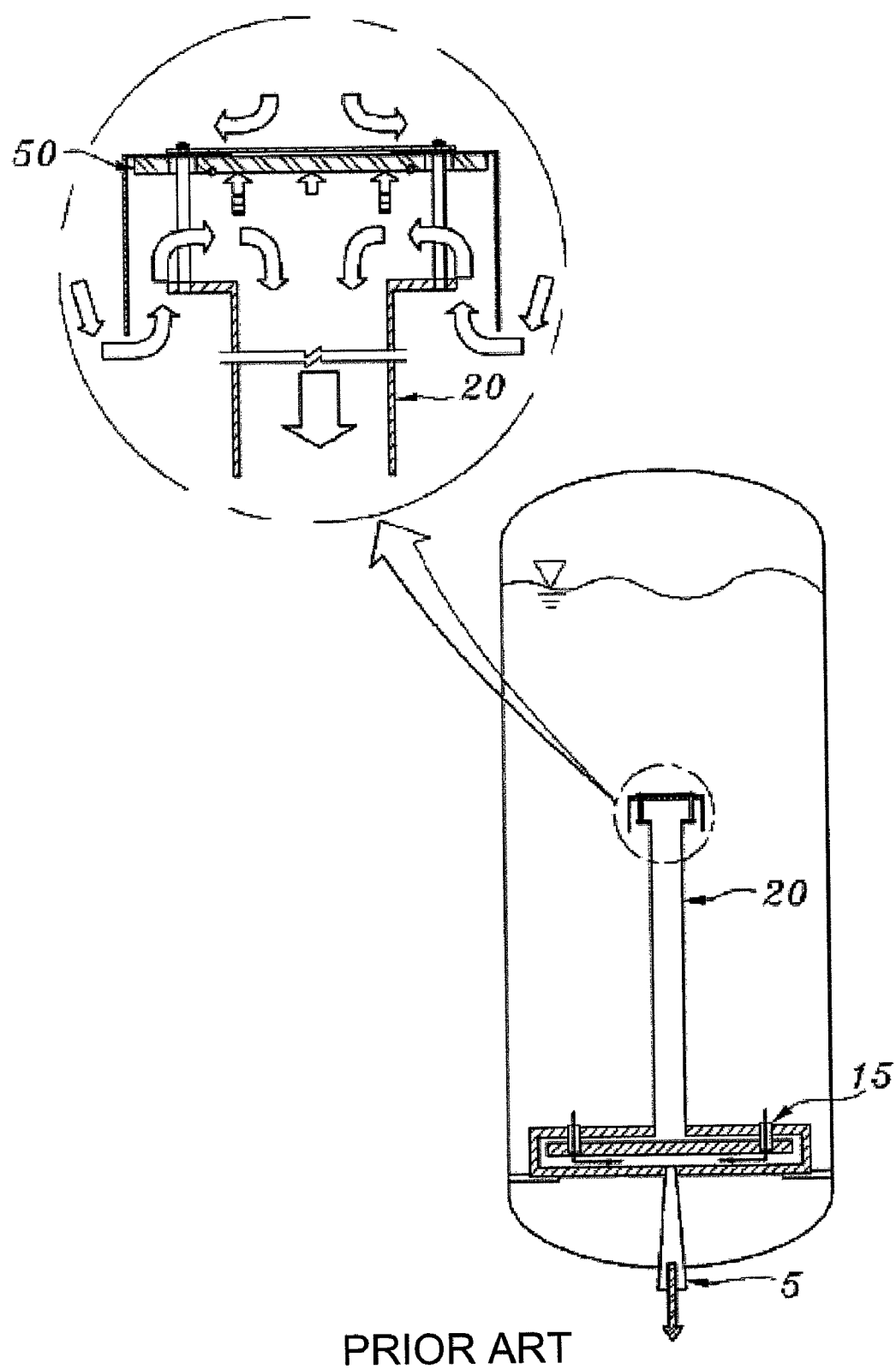
FIG. 3 is a sectional view illustrating a structure configured to close the upper end of a vertical pipe of the fluidic device using a buoyant plate disclosed in Korean Patent No. 556288.

DESCRIPTION OF REFERENCE CHARACTERS
OF IMPORTANT PARTS

| 100: safety injection tank | 110: pressure vessel |
|---|---|
| 112: emergency core cooling water | 120: vertical pipe |
| 121: upper end of vertical pipe | |
| 122: lower end of vertical pipe | |
| 123: high flow inlet port | |
| 124: low flow inlet port | 125: upper flange |
| 126: lower discharge nozzle | |
| 130: gravity-driven fluidic device | |
| 131: spring (plate spring) | |
| 132: vertically movable water tub | |
| 133: protruding surface | 134: drain port |
| 135: guide cylinder | 136: through hole |
| 137: rim of guide cylinder | |
| D: diameter of high flow inlet port | |
| $OD_w$: outer diameter of vertically movable water tub | |
| $ID_c$: inner diameter of guide cylinder | |
| H: height of vertically movable water tub | |
| $H_c$: protruding height of protruding surface | |
| $H_s$: vertical thickness of spring | |
| y*: vertical spacing distance of vertically movable water tub | |

DETAILED DESCRIPTION OF THE INVENTION

Reference will now be made in greater detail to a preferred embodiment of the invention, an example of which is illustrated in the accompanying drawings. Wherever possible, the same reference numerals will be used throughout the drawings and the description to refer to the same or like parts. Further, in the flowing description, a detailed description for the well-known construction and well-known function thereof will be omitted in an effort to avoid confusion of the gist of the present invention.

First, the operational theory of a safety injection tank 100 having a gravity-driven fluidic device 130 according to the present invention, in which the gravity-driven fluidic device 130 completely passively controls a high flow inlet port 123 in response to a variation in the water level of the emergency core cooling water (ECCW) 112 inside the tank 100, will be described in brief hereinbelow.

Figure 4A:
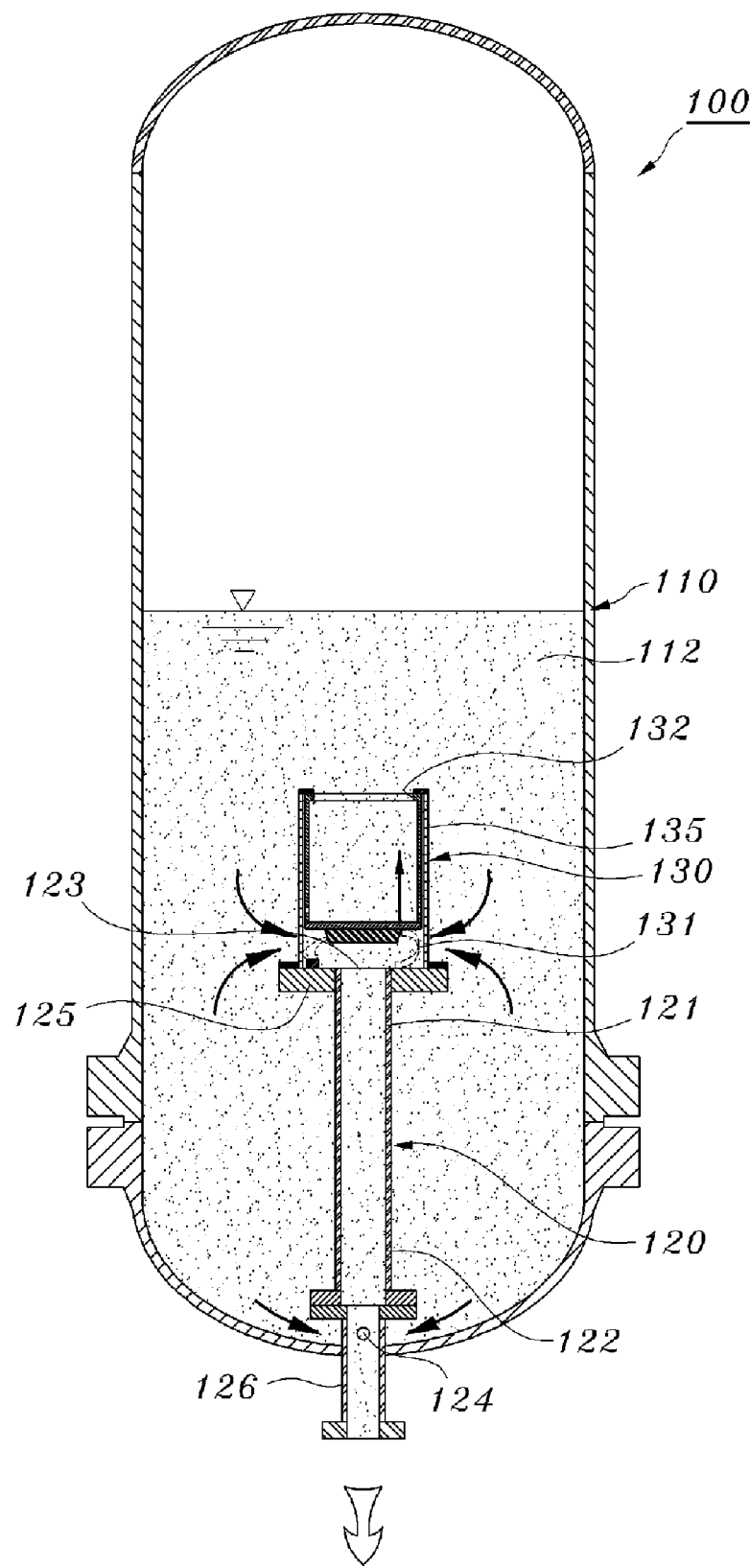
FIG. 4A is a sectional view of a safety injection tank with a gravity-driven fluidic device according to the present invention in a standby state, in which emergency core cooling water is contained in the tank.

FIG. 4A is a sectional view of the safety injection tank 100 having the gravity-driven fluidic device 130 according to the present invention in a standby state, in which ECCW 112 has been sufficiently charged in the tank 100 at a height over the gravity-driven fluidic device 130. Because the ECCW 112 is sufficiently charged in the safety injection tank 100 at a height over the height of the gravity-driven fluidic device 130, the buoyant forces acting inside and outside the vertically movable water tub 132 are offset each other, so that the weight of the ECCW 112 contained in the vertically movable water tub 132 cannot act as a vertical load on a spring 131. Thus, the vertically movable water tub 132 of the gravity-driven fluidic device 130 is biased upwards by the elasticity of the spring 131, so that the high flow inlet port 123 is maintained in an open state.

Figure 4B:
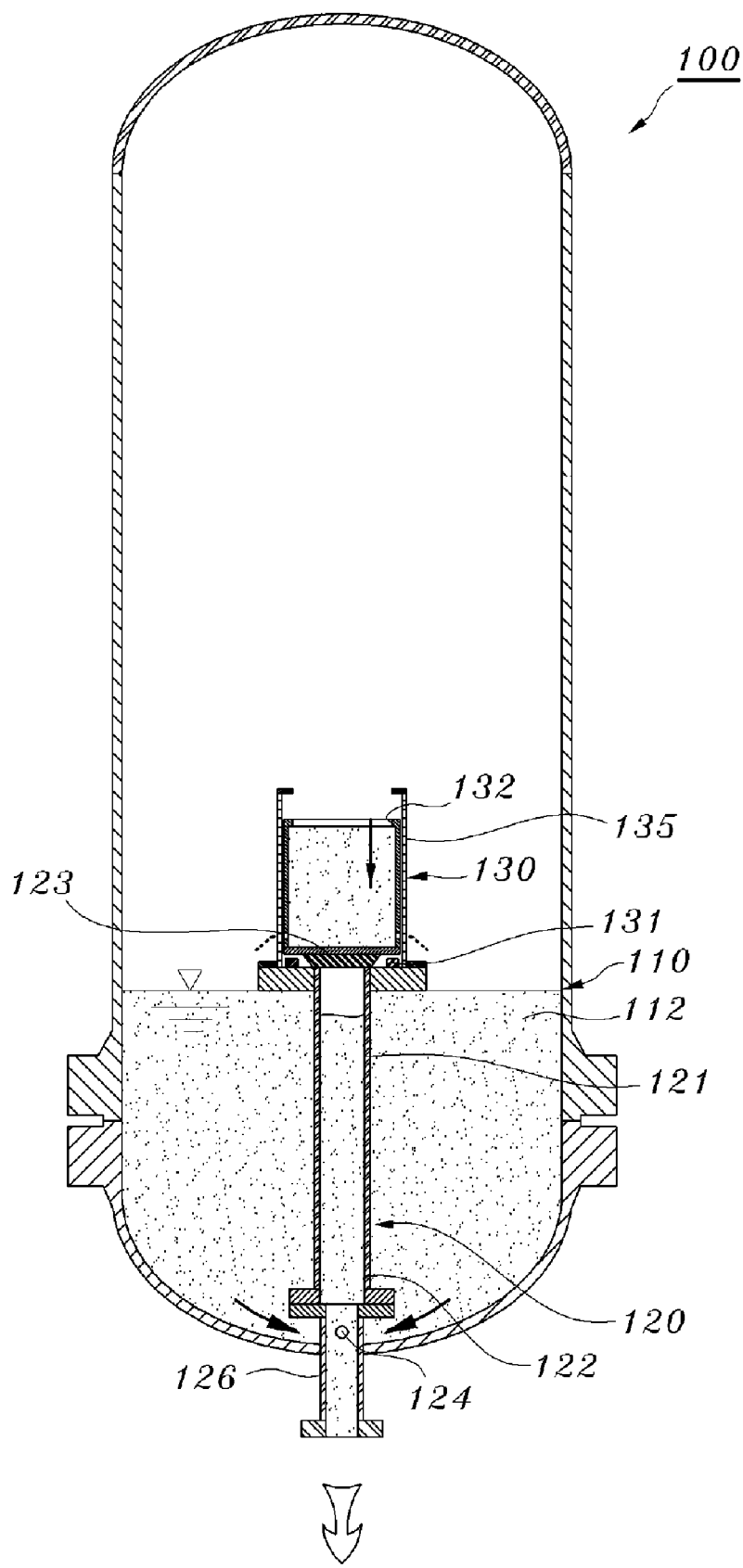
FIG. 4B is a sectional view of the safety injection tank of FIG. 4A in a state in which the emergency core cooling water level is reduced according to operation of the safety injection tank and the high flow inlet port of the vertical pipe is closed.

FIG. 4B is a sectional view of the safety injection tank 100 in a state in which the water level of the ECCW 112 has been reduced according to operation of the safety injection tank 100 to a height lower than the height of gravity-driven fluidic device 130. In the above state, the weight of the ECCW contained in the vertically movable water tub 132 of the gravity-driven fluidic device 130 acts as a vertical load on the spring 131, so that the lower surface of the vertically movable water tub 132 is moved downwards while overcoming the elasticity of the spring 131, thus coming into close contact with the high flow inlet port 123, which is defined in the upper end of the vertical pipe 120. Therefore, the high flow inlet port 123 is closed. At this time, the ECCW injection mode is changed from a high flow injection mode to a low flow injection mode. After the transition of the ECCW injection mode, the ECCW 112 is injected through only a plurality of low flow inlet ports 124 provided in the lower portion inside the safety injection tank 100 and is discharged to the outside of the safety injection tank 100.

The preferred construction of the safety injection tank 100 having the gravity-driven fluidic device 130 according to the present invention will be described hereinbelow with reference to FIG. 4A and FIG. 4B, which illustrate the construction of the safety injection tank 100, and FIG. 5 through FIG. 9, which illustrate an embodiment of the gravity-driven fluidic device 130.

The safety injection tank 100 according to the present invention comprises a gravity-driven fluidic device 130. the gravity-driven fluidic device 130 includes a cylindrical pressure vessel 110 for containing ECCW 112 therein; a vertical pipe 120, which has a tubular shape and is placed upright inside the pressure vessel 110, with at least one low flow inlet port 124 formed in a sidewall of a lower portion of the vertical pipe 120 and communicating with the lower portion inside the pressure vessel 110, and a high flow inlet port 123 defined in the upper end 121 of the vertical pipe 120, which is open to the inner space of the pressure vessel 110; a spring 131, which is placed on an upper flange 125 provided on the upper end 121 of the vertical pipe 120; and a vertically movable water tub 132, which is movably placed on the spring 131 so as to be moved upwards and downwards and is configured to contain therein ECCW 112. Here, when the ECCW 112 contained in the pressure vessel 110 is discharged outside the vessel 110 through the vertical pipe 120 such that the water level of the ECCW 112 inside the vessel 110 is reduced to a height lower than the vertical position of the vertically movable water tub 132, the vertically movable water tub 132 elastically supported by the spring 131 is moved downwards such that the lower surface thereof comes into close contact with the upper end 121 of the vertical pipe 120, thus closing the high flow inlet port 123.

Unlike a conventional safety injection tank, in which a fluidic device is mounted to the lower portion of the tank, the safety injection tank 100 according to the present invention has the low flow inlet port 124 formed in the side surface of a discharge nozzle, which penetrates through the lower hemispherical surface of the safety injection tank 100, and the high flow inlet port 123 defined in the upper end of the vertical pipe 120, so that the safety injection tank 100 has a simple construction having a turndown ratio determined by a flow area ratio between the high flow inlet port 123 and the low flow inlet port 124.

The simplified turndown ratio is described by the following relational expression (1).

$$d^2 = \frac{1}{N} \times \frac{1}{TDR} \times (D^2 + Nd^2) \qquad 1$$

where d is the diameter of the low flow inlet port 124, N is the number of low flow inlet ports 124, TDR is the turndown ratio between the high flow rate and the low flow rate, and D is the diameter of the high flow inlet port 123. Therefore, when assuming that the high flow inlet port 123 and the low flow inlet port 124 are designed to have similar flow conditions, the turndown ratio can be easily determined using the diameter D of the vertical pipe 120 corresponding to the high flow inlet port 123, the number N of low flow inlet ports 124 and the diameter d of the low flow inlet port 124. Further, when an appropriate turndown ratio has been determined prior to designing a reactor system, the relational expression (1) can be used.

The construction of the pressure vessel 110, defining the appearance of the safety injection tank 100, and the vertical pipe 120 remains the same as that of conventional structures, so that the detailed description for the construction thereof will be omitted. In the following description, the construction of the gravity-driven fluidic device 130, which is the gist of the present invention, will be described. However, because the safety injection tank 100 of the present invention has both the pressure vessel 110 and the vertical pipe 120, the construction of which remains the same as that of conventional structures, the gravity-driven fluidic device 130 of the present invention will be easily adapted to a conventional safety injection tank 100.

Figure 5:
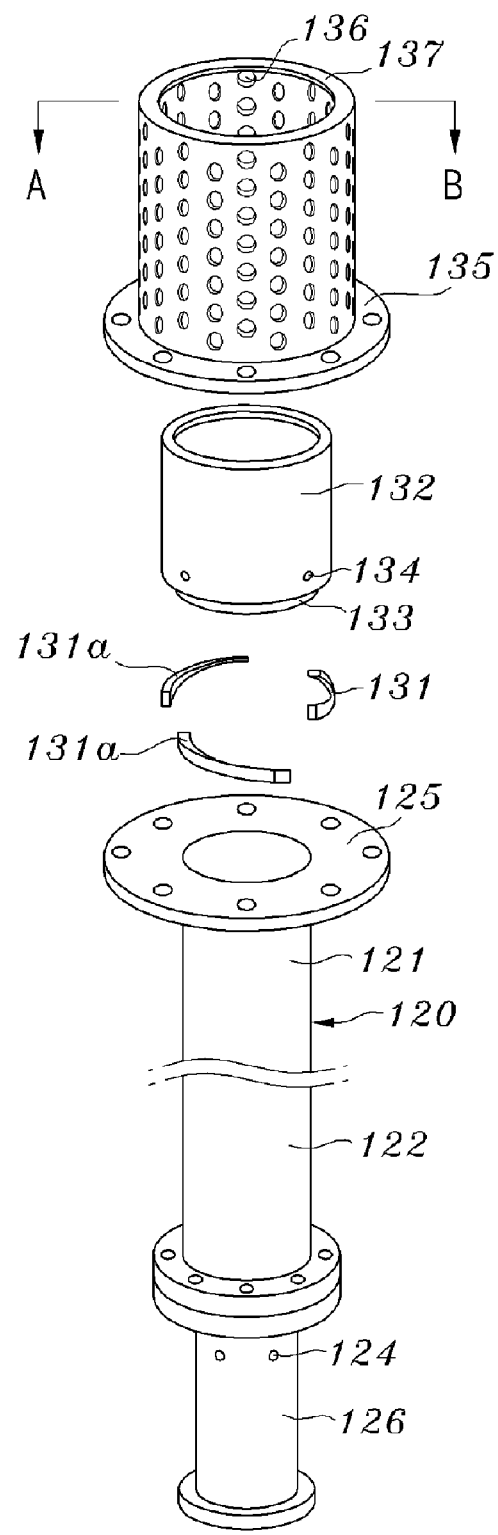
FIG. 5 is an exploded perspective view of the gravity-driven fluidic device provided in the safety injection tank according to the present invention.

FIG. 5 is an exploded perspective view illustrating the construction of the gravity-driven fluidic device 130 according to the present invention. The spring 131 is securely mounted to the upper flange 125 of the vertical pipe 120. In the embodiment of the present invention, three plate springs 131, which are placed along an imaginary circumference outside the high flow inlet port 123 at regular intervals and each of which is bent to form an arc-shape, are used as the spring 131. In the embodiment, the arc-shaped plate springs 131 are advantageous in that they can minimize the possibility of blocking the side flow path of the high flow inlet port 123. In the description of the present invention, it should be understood that the technical term "spring" used to describe the construction of the invention must be recognized as a term commonly designating a means having elasticity or resilience. Thus, a coil spring or a plastic spring in addition to the arc-shaped plate spring 131 may be used as the spring 131.

In the present invention, the spring 131 must be configured to have a spring constant satisfying predetermined requirements regardless of classification of the spring 131. In the same manner as that described above for the theory of the present invention, to allow the vertically movable water tub 132 to be passively moved upwards or downwards according to a difference between buoyant forces acting inside and outside the tub 132 as described above, the relationship between the maximum displacement of the vertically movable water tub 132, the weight of the vertically movable water tub 132, the weight of ECCW contained in the vertically movable water tub 132, and the spring constant of the spring 131 must be described by the following relational expression (2).

$$\frac{W_T}{H_S} \le k \le \frac{W_w \mid W_T}{y^* + \frac{1}{2}H_S} \qquad 2$$

where $W_w$ is the weight of ECCW contained in the vertically movable water tub 132, $W_T$ is the weight of the vertically movable water tub 132, k is the spring constant of the spring 131, $H_S$ is the vertical thickness of the spring 131, and y* is the vertical spacing distance of the vertically movable water tub 132. In other words, as expressed by the above expression (2), the spring constant of the spring 131 must be determined such that the spring 131 can lift the vertically movable water tub 132 upwards when the tub 132 is in an empty state and can allow the vertically movable water tub 132 containing ECCW therein to be moved downwards by the vertical spacing distance. If a plurality of springs 131 is installed, the sum of the spring constants of the springs 131 is used as the spring constant k in the above relational expression (2).

Figure 7:
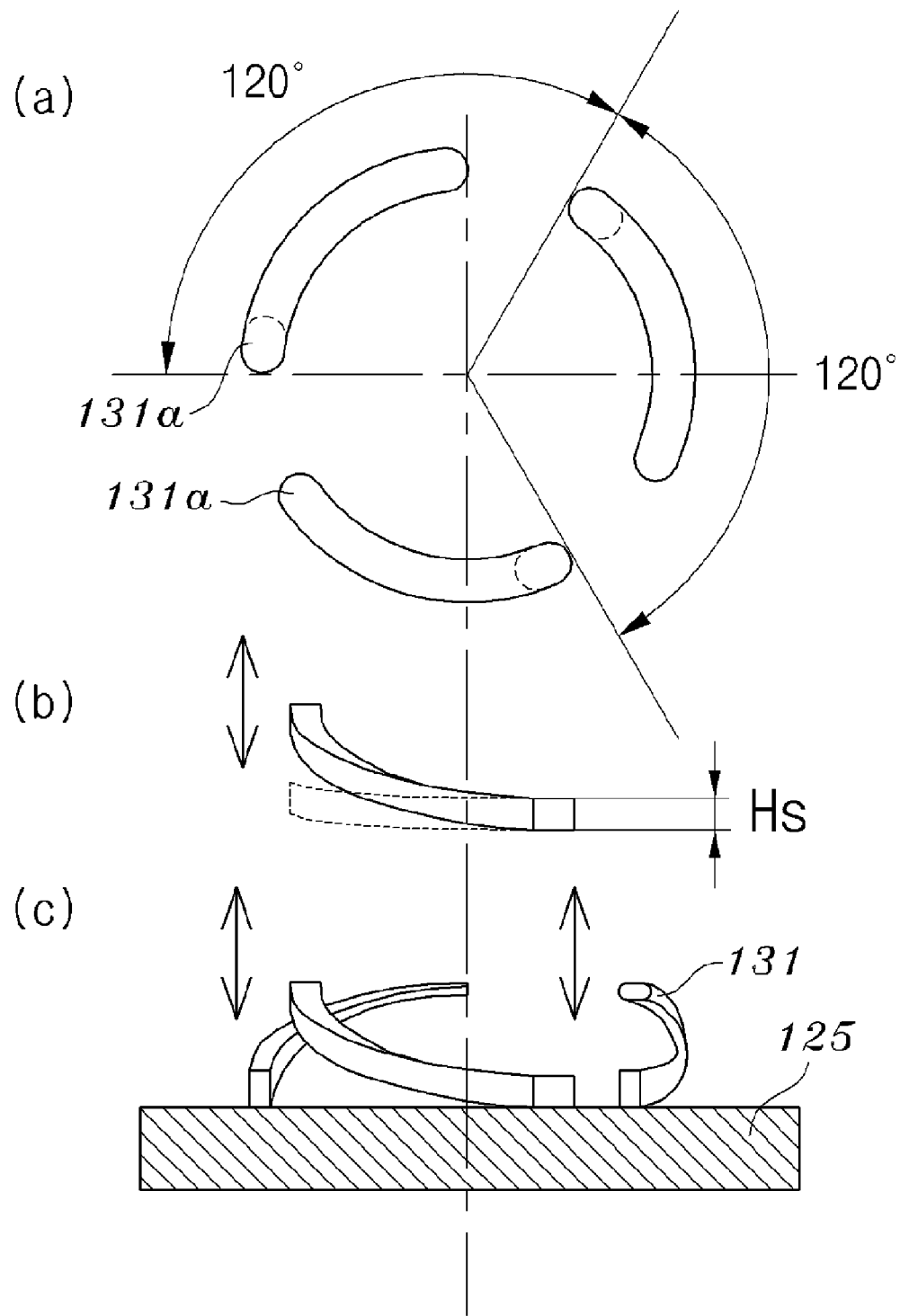
FIG. 7 is a view illustrating an example of arrangements of plate springs provided in the gravity-driven fluidic device according to the present invention.

FIG. 7 illustrates an arrangement of the three plate springs 131 used in the embodiment of the present invention. As shown in FIG. 7, the three arc-shaped plate springs 131 are arranged at regular intervals along an imaginary circumference outside the high flow inlet port 123 defined in the upper end of the vertical pipe 120. The circumferential length of each of the arc-shaped plate springs 131 is determined such that each plate spring 131 has a circumferential angle not exceeding 90°, based on an orthogonal projection relative to the upper end of the vertical pipe 120. Further, the three plate springs 131 are placed along the circumference at angular intervals of 120°. The circumferential spaces of 30° angles between the three plate springs 131 allow the plate springs 131 to contract and expand without interference between them. The dimension Hs, shown in FIG. 7, designates a vertical thickness of each plate spring 131. Further, it is preferred to determine the spring constant is k of the spring 131 used in the relational expression (2) such that the value of y*, which is the vertical spacing distance between the high flow inlet port 123 and the vertically movable water tub 132, is 0.5~1.0 times the inner diameter D of the high flow inlet port 123.

Further, the vertically movable water tub 132 is placed on the spring 131. Here, if the vertically movable water tub 132 has an inner space capable of containing ECCW therein and is open in the upper end thereof so as to allow ECCW to freely flow thereinto, the shape of the tub 132 may be freely designed without limit. However, the vertically movable water tub 132 must be configured such that, when the spring 131, which is in contact with the lower end of the vertically movable water tub 132, is compressed, the lower end of the vertically movable water tub 132 can come into contact with the high flow inlet port 123. In order to achieve the above object, a protruding surface 133, which has a protruding height (Hc=1.5×Hs) that is 1.5 times the thickness Hs of the spring 131, is provided on the lower surface of the tub 132. Of course, it is necessary for the protruding surface 133 to completely close the flow area of the high flow inlet port 123 so as to prevent ECCW or nitrogen gas from flowing into the high flow inlet port 123.

Further, it is preferred to form at least one small-sized drain port 134 in a sidewall of the vertically movable water tub 132. The drain port 134 functions to slowly discharge the ECCW from the vertically movable water tub 132. Otherwise, the vertically movable water tub 132 containing ECCW therein may compress the spring 131 for a lengthy period of time, thereby causing a plastic deformation or a reduction in the elasticity of the spring 131. Particularly, in order to effectively prevent early injection of nitrogen gas, the entire flow area of the at least one drain port 134 is preferably determined such that, after the ECCW 112 contained in the safety injection tank 100 is completely discharged to the outside through the vertical pipe 120, the drain port 134 can completely discharge the ECCW 112 from the vertically movable water tub 132 to the outside.

A guide cylinder 135 may be provided outside the vertically movable water tub 132 such that the guide cylinder 135 surrounds the tub 132 and is coupled to the upper end of the vertical pipe 120 through a flange. The guide cylinder 135 prevents the vertically movable water tub 132 from playing in a plane perpendicular to the vertical moving direction of the tub 132. A rim 137 is formed on the upper end of the guide cylinder 135 and prevents the vertically movable water tub 132 from being unexpectedly removed upwards.

Figure 8:
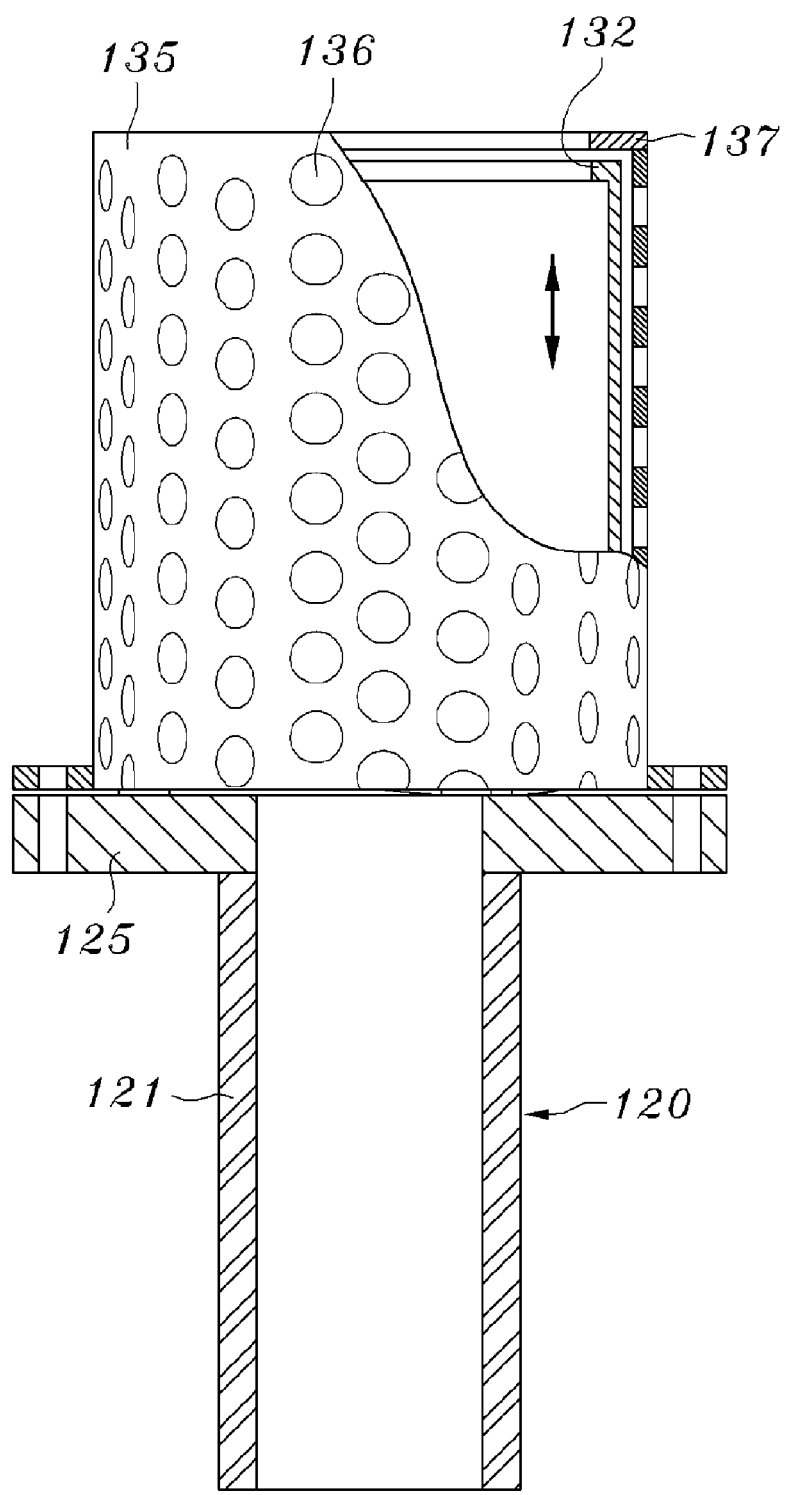
FIG. 8 is a partially sectioned view of a guide cylinder provided in the gravity-driven fluidic device according to the present invention.

Further, a plurality of through holes 136 are formed through the sidewall of the guide cylinder 135, as shown in FIG. 8. The through holes 136 define a flow path between the high flow inlet port 123, formed in the upper end of the vertical pipe 120, and the lower end of the vertically movable water tub 132, thus allowing ECCW 112 to flow therethrough. Here, the flow area formed by the through holes 136 must have a substantially large area capable of allowing a high flow inlet of ECCW from the outside of the guide cylinder 135. For example, the total flow area of the through holes 136, which are formed in a portion of the guide cylinder 135 corresponding to the vertical spacing distance y* of the vertically movable water tub 132, must be determined such that it is included within a range of 1.2~1.5 times the flow area of the high flow inlet port 123. Further, the through holes 136 have a collateral function as a path capable of easily discharging boron crystals or other impurities, which have been caught between the guide cylinder 135 and the vertically movable water tub 132, to the outside of the guide cylinder 135.

Figure 6:
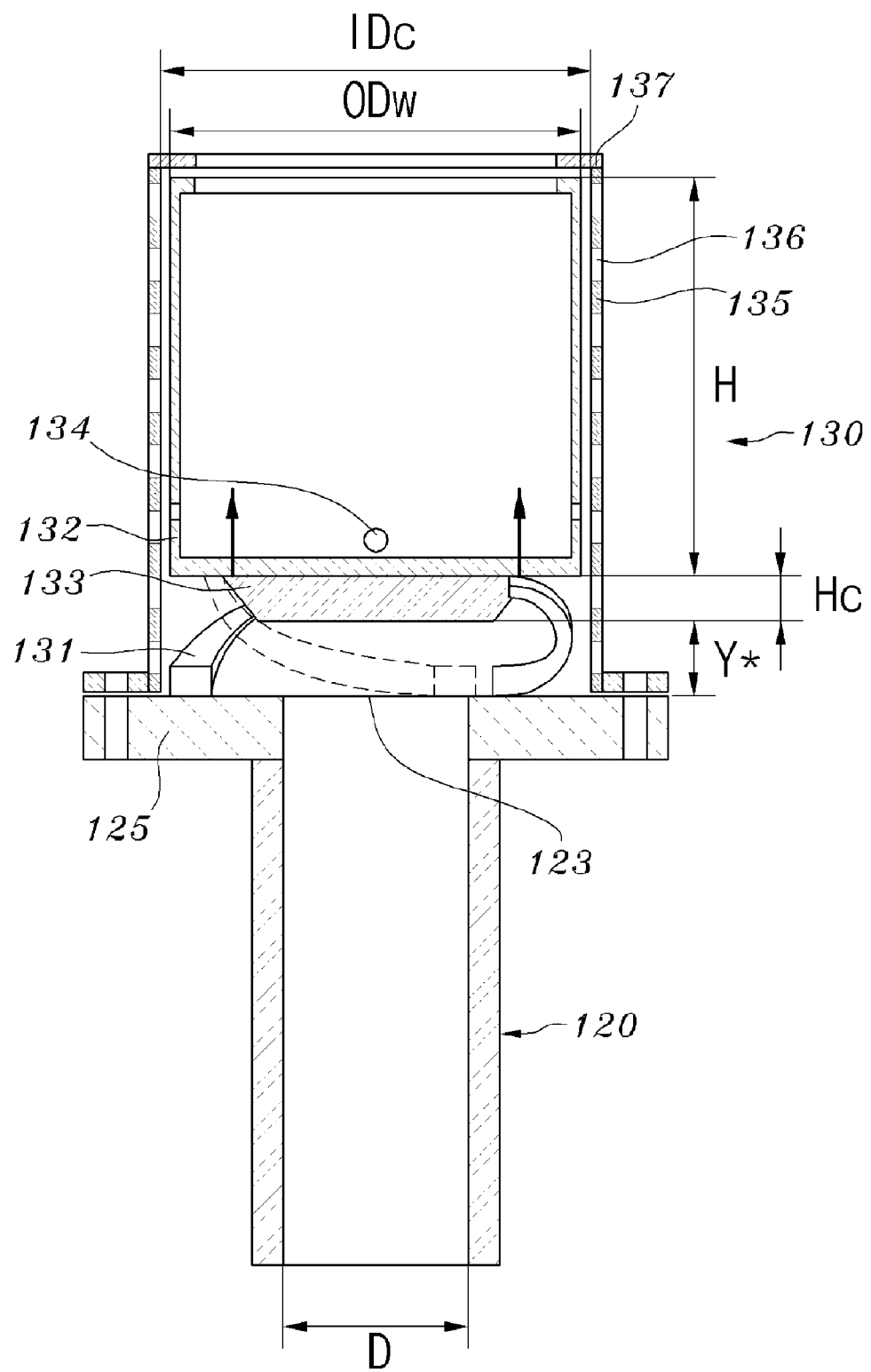
FIG. 6 is a sectional view of the gravity-driven fluidic device taken along line A-B of FIG. 5.

The relative dimensions of the above-mentioned parts constituting the gravity-driven fluidic device 130 will be described hereinbelow with reference to FIG. 6.

In the following description, the relative dimensions of the parts of the gravity-driven fluidic device 130 will be described based on the inner diameter D of the vertical pipe 120, which is the inner diameter of the high flow inlet port 123. The outer diameter $OD_w$ of the vertically movable water tub 132 is determined as 1.5 D, the inner diameter $ID_c$ of the guide cylinder 135 is preferably determined as 1.6 D. When the inner diameter of the guide cylinder 135 is set to be larger than the outer diameter of the vertically movable water tub 132 as described above, an appropriate gap can be defined between the guide cylinder 135 and the vertically movable water tub 132 so that the guide cylinder 135 can efficiently guide vertical movement of the vertically movable water tub 132 while preventing the tub 132 from exceedingly playing during vertical movement of the tub 132 or from being fixed to the guide cylinder 135. The height H of the vertically movable water tub 132 is preferably determined as 1.5~2.0 D.

Further, the vertical spacing distance y* of the vertically movable water tub 132 must be determined to be larger than the flow area of high flow inlet port 123 of the vertical pipe 120, thus securing a desired flow area ($\pi \times ID_c \times y^*$). Further, the vertical spacing distance y* of the vertically movable water tub 132, which corresponds to the maximum moving distance of the vertically movable water tub 132, must be determined such that the upper end of the vertical pipe 120 can be closed within an appropriate time period according to a reduction in the water level in the safety injection tank 100. When the above-mentioned requirements are considered along with the size of the vertically movable water tub 132, the vertical spacing distance y* of the vertically movable water tub 132 is preferably determined as 0.5~1.0 D. The time period, required to change the flow injection mode from a high flow injection mode to a low flow injection mode, is reduced in proportion to the vertical spacing distance y*.

Figure 9:
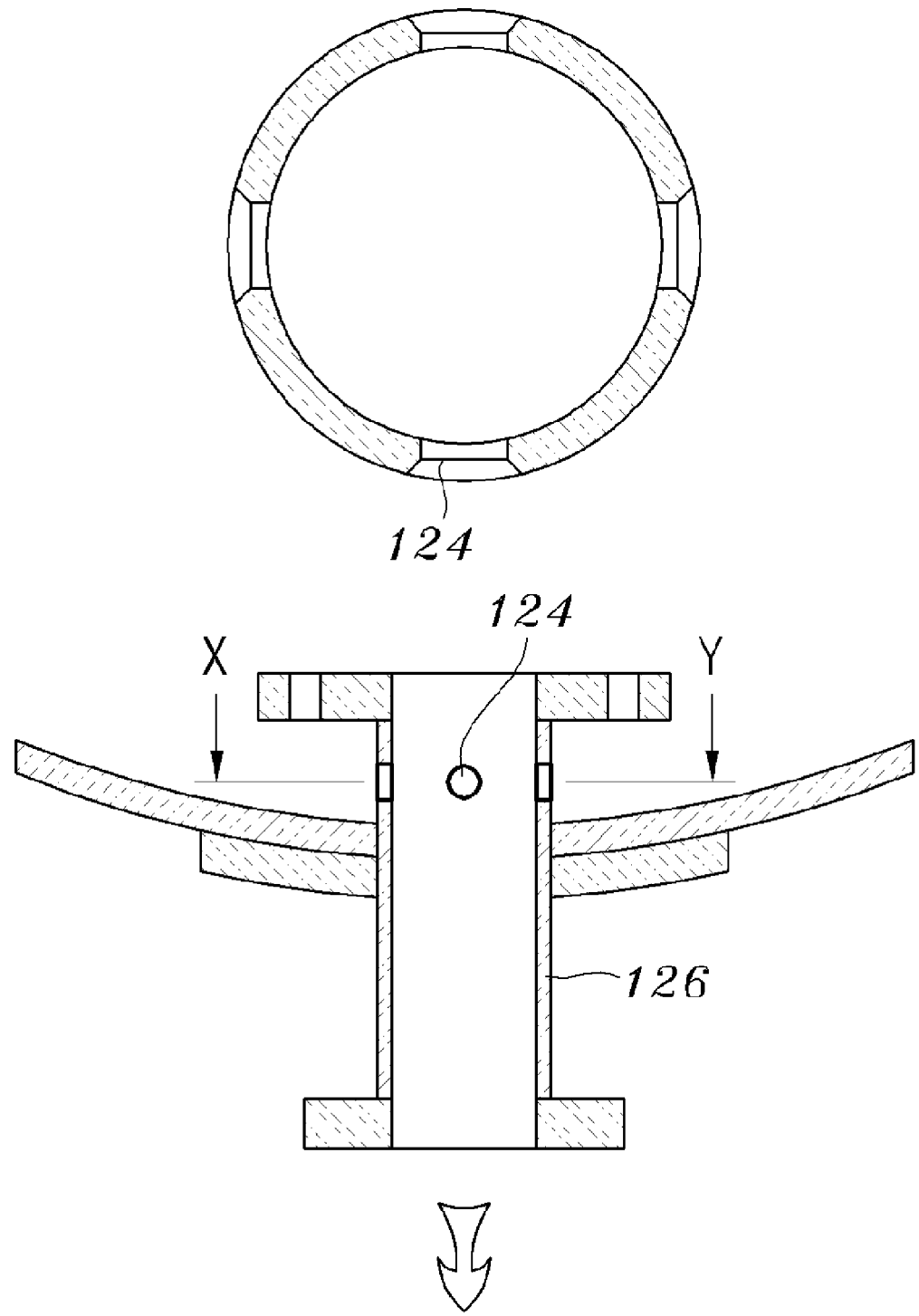
FIG. 9 is a view illustrating an embodiment of the present invention, in which a plurality of low flow inlet ports is formed in a lower discharge nozzle of the safety injection tank.

FIG. 9 is a sectional view illustrating the construction of the low flow inlet port 124. Particularly, FIG. 9 shows a lower discharge nozzle 126, which has a diameter of ½ of the diameter of the high flow inlet port 123 and is coupled to the lower end 122 of the vertical pipe 120 through a flange, with the low flow inlet port 124 formed in the lower discharge nozzle 126. Of course, the low flow inlet port 124 may be formed in the lower end 122 of the vertical pipe 120.

The low flow inlet port 124 is always open and is preferably formed at a location around the lowermost portion of the lower hemispherical surface of the safety injection tank 100. When the low flow inlet port 124 is formed at the location around the lowermost portion of the safety injection tank 100 as described above, the low flow inlet port 124 can form a downward flow path, through which ECCW contained in the lower portion of the safety injection tank 100 can be completely discharged from the tank 100 to the reactor system and impurities accumulated in the lower portion of the safety injection tank 100 can be easily discharged due to gravity. FIG. 9 illustrates four low flow inlet ports 124, which are formed in the sidewall of the lower discharge nozzle 126 of the safety injection tank 100 at angular intervals of 90°. The diameter d of the low flow inlet port 124 can be determined using the relational expression (1).

The operation of the safety injection tank 100 according to the present invention will be described hereinbelow, based on the operation of the above-mentioned gravity-driven fluidic device 130, with reference to FIG. 10A through FIG. 10D.

Figure 10A:
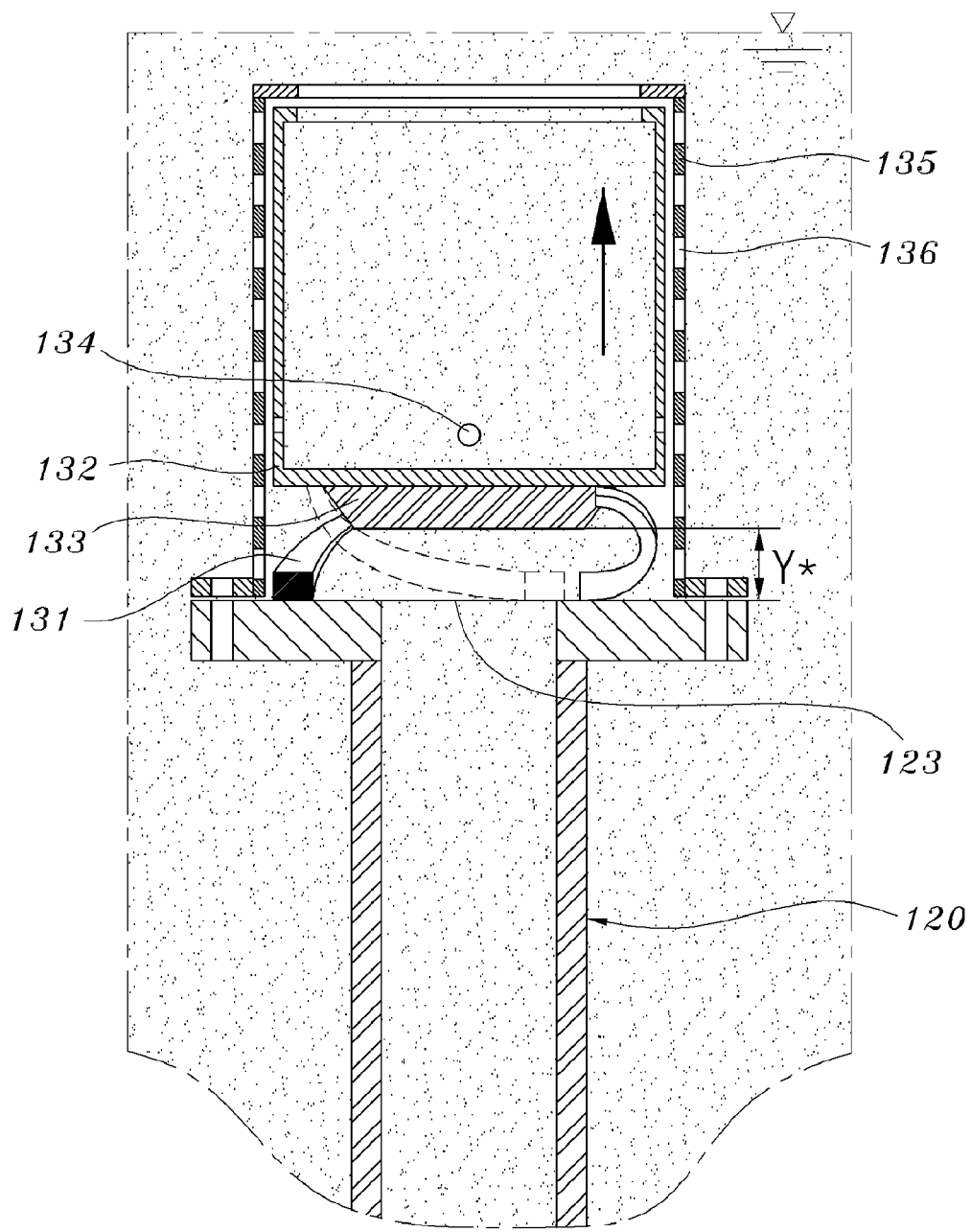
FIG. 10A through FIG. 10D are views illustrating operation of the gravity-driven fluidic device provided in the safety injection tank according to the present invention.

FIG. 10A illustrates a standby state, in which ECCW has been charged in the safety injection tank 100 and the vertically movable water tub 132 is lifted upwards by the three arc-shaped plate springs 131, so that the high flow inlet port 123 of the vertical pipe 120 can be maintained in an open state. In the state shown in FIG. 10A, the water level of ECCW contained in the safety injection tank 100 is higher than the height of the vertically movable water tub 132. In other words, ECCW is contained inside and outside the vertically movable water tub 132 in the above state, so that the buoyant forces acting inside and outside the vertically movable water tub 132 are offset each other and the weight of the ECCW contained in the vertically movable water tub 132 cannot act as a vertical load on the plate springs 131. Thus, only the weight of the vertically movable water tub 132 acts as the vertical load on the springs 131. Because the plate spring 131 has a spring constant satisfying the relational expression (2), the vertically movable water tub 132 of the gravity-driven fluidic device 130 is biased upwards by the elasticity of the springs 131, so that the high flow inlet port 123 of the vertical pipe 120 is maintained in an open state.

Figure 10B:
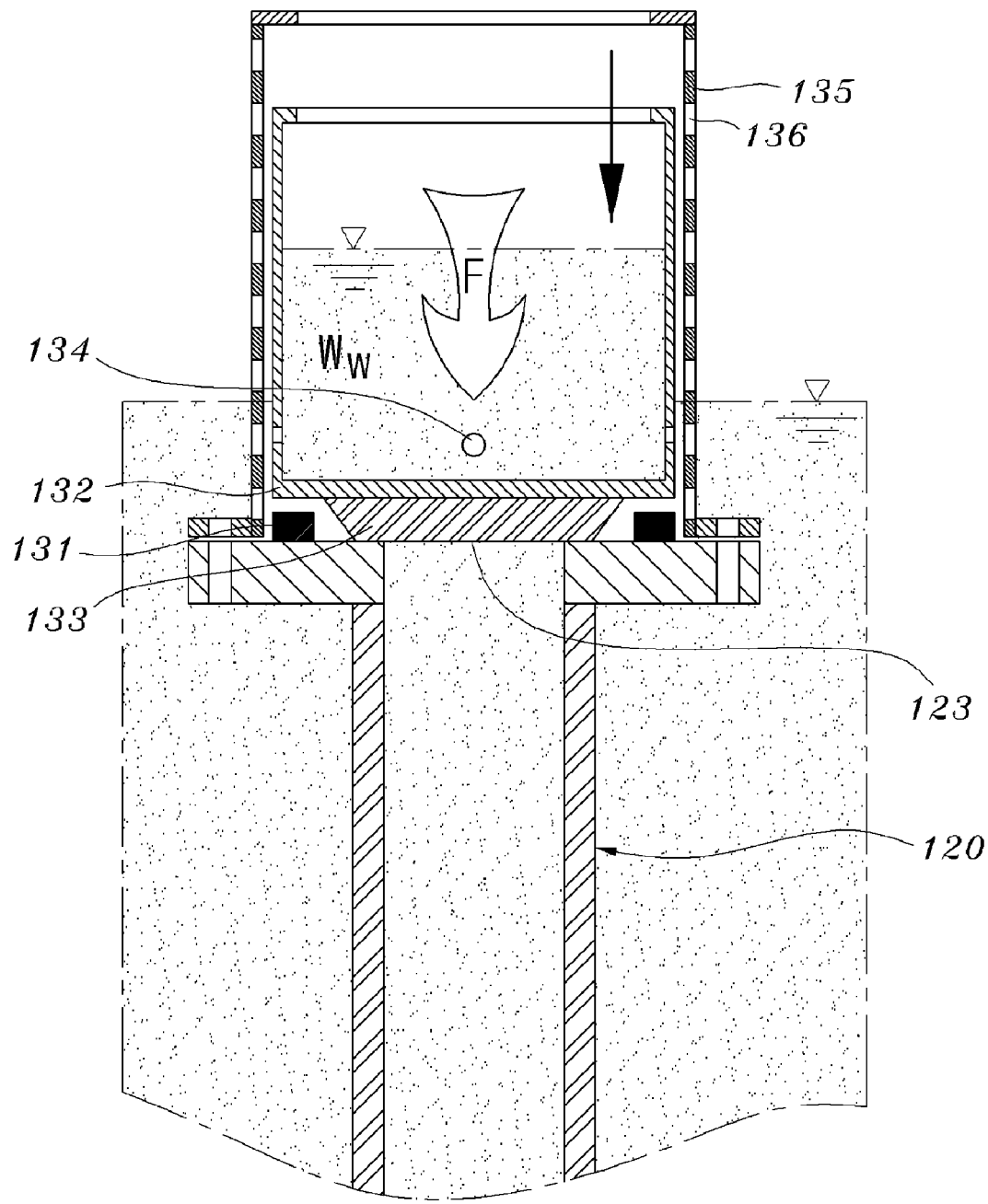

FIG. 10B illustrates a state, in which the water level of ECCW inside the safety injection tank 100 is reduced according to operation of the safety injection tank 100 to a height lower than the height of the gravity-driven fluidic device 130. In the above state, the vertical load acting on the plate springs 131 is increased by the weight of the ECCW contained in the vertically movable water tub 132 of the gravity-driven fluidic device 130, so that the increased vertical load presses the springs 131 downwards and the lower surface of the vertically movable water tub 132 is moved downwards, thus coming into close contact with the high flow inlet port 123 of the vertical pipe 120. Here, the plate spring 131 has a spring constant satisfying the relational expression (2) as described above, so that the plate springs 131 are pressed downwards by the vertically movable water tub 132. Thus, the lower surface of the vertically movable water tub 132 comes into close contact with the high flow inlet port 123 of the vertical pipe 120.

Figure 10C:
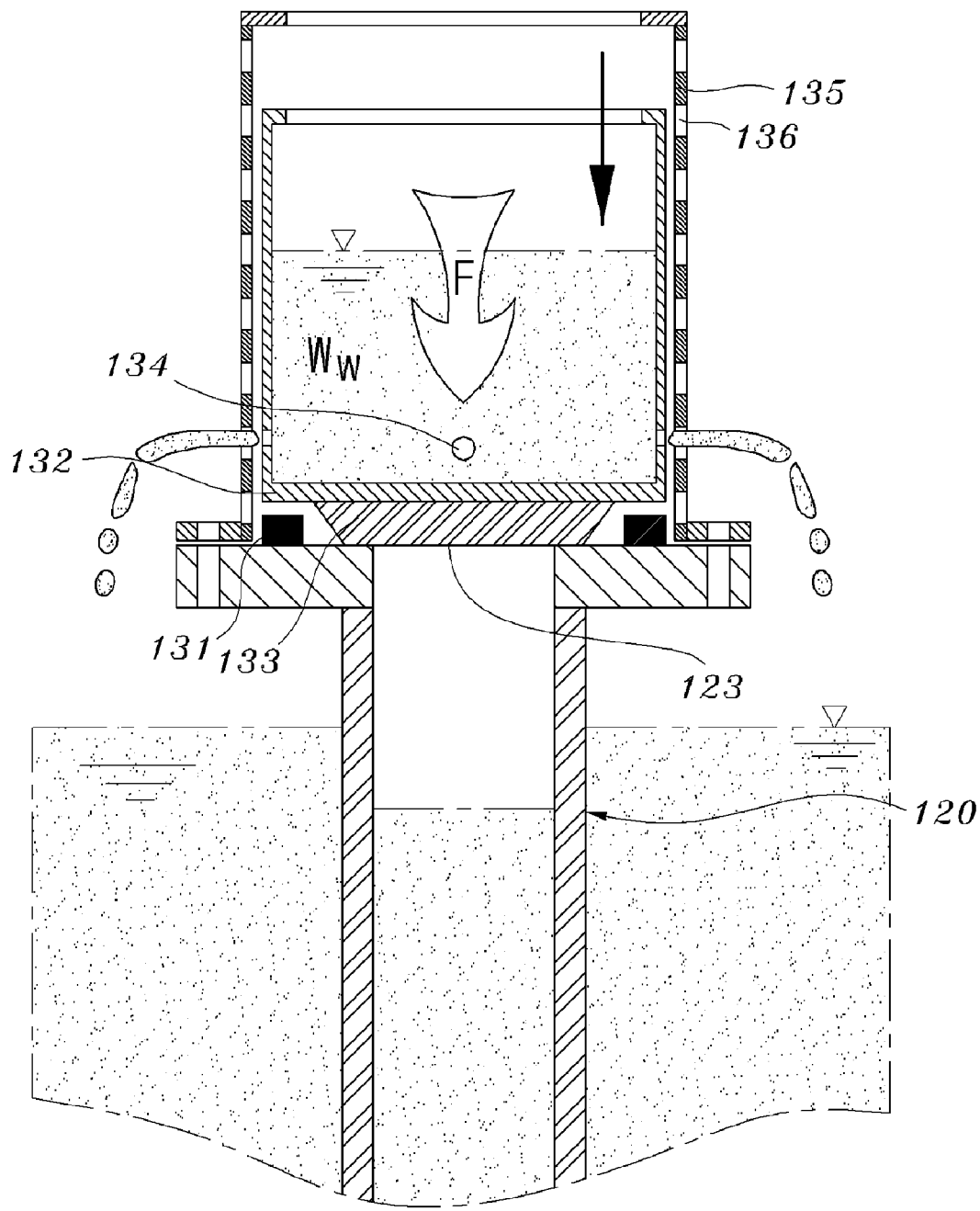
Figure 10D:
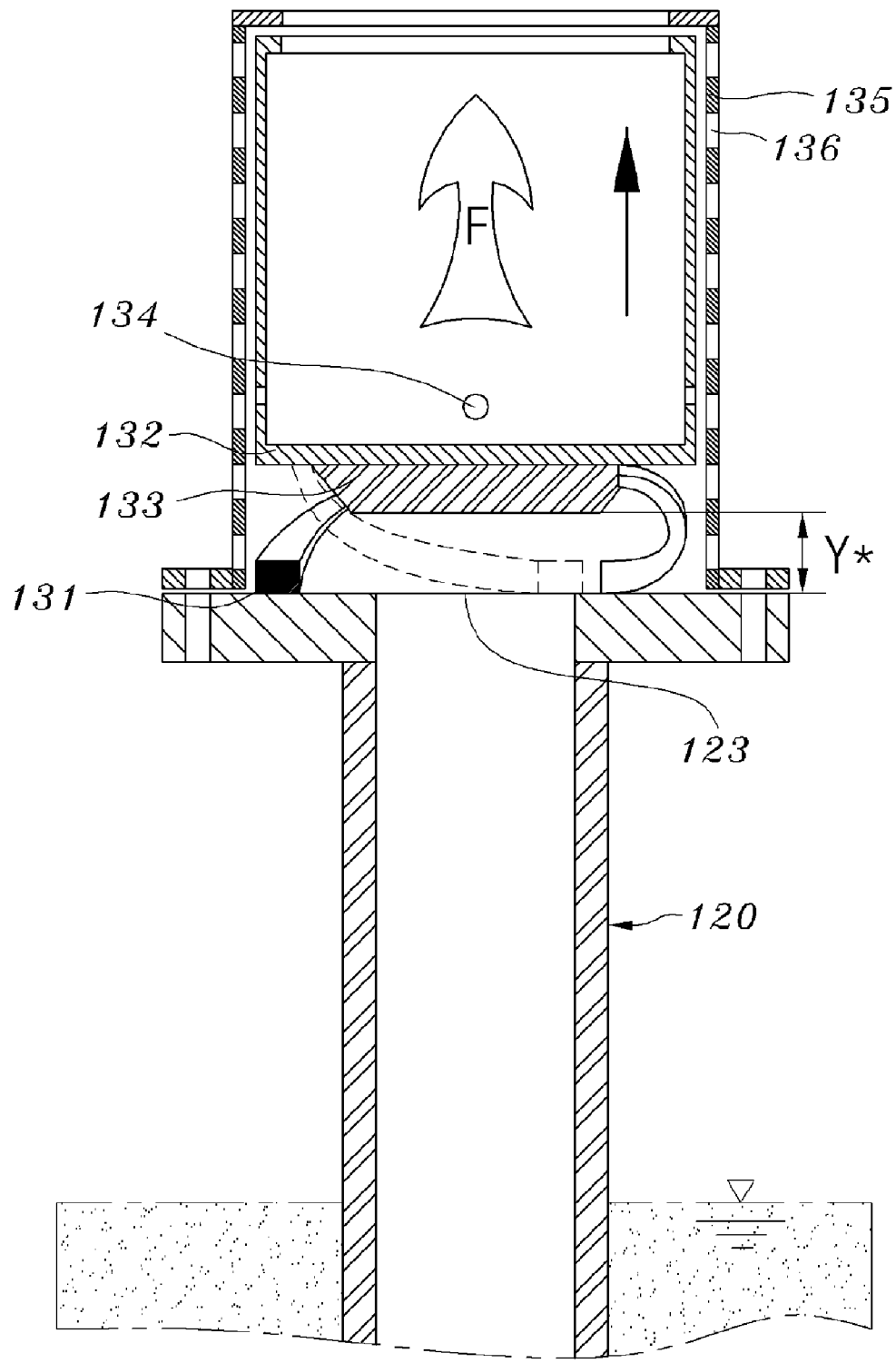

FIG. 10C and FIG. 10D illustrate sequential processes, in which, as time goes by, the ECCW contained in the vertically movable water tub 132 is slowly and completely discharged from the tub 132 outwards through the small-sized drain port 134 formed in the lower portion of the sidewall of the vertically movable water tub 132, so that the weight of ECCW is reduced and the vertical load acting on the plate springs 131 is reduced, and the plate springs 131 elastically lift the vertically movable water tub 132 upwards, thus reopening the high flow inlet port 123 of the vertical pipe 120. In the states illustrated in FIG. 10A and FIG. 10D, only the weight of the vertically movable water tub 132 functions as vertical load acting on the plate springs 131, so that the two states may be recognized as the same state.

In the above description, the present invention has been described for a preferred embodiment of the safety injection tank 100 having the gravity-driven fluidic device 130. However, it should be understood that the preferred embodiment of the present invention, which has been described, is only for illustrative purposes, and those skilled in the art will appreciate that various modifications, additions and substitutions are possible, without departing from the scope and spirit of the invention as disclosed in the accompanying claims.

What is claimed is:

1. A safety injection tank with a gravity-driven fluidic device, comprising:
   a cylindrical pressure vessel configured to contain emergency core cooling water therein;
   a tubular vertical pipe uprightly placed inside the pressure vessel and provided with at least one first flow inlet port formed in a side surface of a lower portion of the vertical pipe communicating with a lower surface of the pressure vessel and a second flow inlet port defined in an upper end of the vertical pipe which is open to an inner space of the pressure vessel;
   a gravity-driven fluidic device comprising: a spring placed in the upper end of the vertical pipe; and a vertically movable water tub movably placed on the spring so as to be movable in a vertical direction, and configured to contain the emergency core cooling water therein; and
   a guide cylinder mounted to the upper end of the vertical pipe and arranged to entirely surround a side surface of the vertically movable water tub and a portion of an upper surface of the vertically movable water tub, and wherein a plurality of through holes are formed in a surface of the guide cylinder;
   wherein, when the emergency core cooling water contained in the pressure vessel is externally discharged through the vertical pipe and an emergency core cooling water level is reduced lower than a vertical position of the vertically movable water tub, the vertically movable water tub elastically biased by the spring is moved in a downward direction such that a lower surface of the vertically movable water tub comes into contact with the vertical pipe to close the second flow inlet port.

2. The safety injection tank with the gravity-driven fluidic device according to claim 1, wherein the lower portion of the vertical pipe is provided with a lower discharge nozzle having the first flow inlet port therein and a diameter, which is ½ of a diameter of the second flow inlet port.

3. The safety injection tank with the gravity-driven fluidic device according to claim 1, wherein a diameter of the second flow inlet port, a diameter of the first flow inlet port and a number of the first flow inlet ports is described by a following relational expression according to a predetermined turndown ratio, $$d^2 = \frac{1}{N} \times \frac{1}{TDR} \times (D^2 + Nd^2)$$

Where d is the diameter of the first flow inlet port, N is the number of the first flow inlet ports, TDR is the turndown ratio between a first flow rate and a second flow rate, and D is the diameter of the second flow inlet port.

4. The safety injection tank with the gravity-driven fluidic device according to claim 1, wherein a spring constant of the spring is described by a following relational expression $$\frac{W_T}{H_S} \le k \le \frac{W_w + W_T}{y^* + \frac{1}{2}H_S}$$

Where $W_w$ is a weight of emergency core cooling water contained in the vertically movable water tub, $W_T$ is a weight of the vertically movable water tub, k is the spring constant of the spring, $H_S$ is a vertical thickness of the spring, and y* is a vertical spacing distance of the vertically movable water tub.

5. The safety injection tank with the gravity-driven fluidic device according to claim 1, wherein the vertically movable water tub is provided with at least one drain port formed in a side surface thereof.

6. The safety injection tank with the gravity-driven fluidic device according to claim 5, wherein the at least one drain port is sized to have a total flow area, which can completely discharge the emergency core cooling water contained in the vertically movable water tub after the emergency core cooling water contained in the pressure vessel has been completely discharged to the outside through the vertical pipe.

7. The safety injection tank with the gravity-driven fluidic device according to claim 1, wherein the spring comprises at least one arc-shaped plate spring placed in a circumferential direction outside the second flow inlet port, the plate spring having a height equal to a vertical spacing distance of the vertically movable water tub.

8. The safety injection tank with the gravity-driven fluidic device according to claim 7, wherein the arc-shaped plate spring comprises three plate springs having a circumferential length corresponding to a 90° angle of circumference when they are orthogonally projected relative to the upper end of the vertical pipe, the three plate springs being spaced apart from each other at 120° angular intervals.

9. The safety injection tank with the gravity-driven fluidic device according to claim 1, wherein an outer diameter ($OD_w$) of the vertically movable water tub is 1.5 times an inner diameter (D) of the vertical pipe, a height (H) of the vertically movable water tub is 1.5~2.0 times the inner diameter (D) of the vertical pipe, and an inner diameter ($ID_c$) of the guide cylinder is 1.6 times the inner diameter (D) of the vertical pipe.

10. The safety injection tank with the gravity-driven fluidic device according to claim 4, wherein the vertical spacing distance (y*) of the vertically movable water tub is 0.5~1.0 times the inner diameter (D) of the vertical pipe.

11. The safety injection tank with the gravity-driven fluidic device according to claim 1, wherein a total flow area of the through holes, which are formed in the guide cylinder within a range corresponding to the vertical spacing distance of the vertically movable water tub, is set as 1.2~1.5 times a flow area of the second flow inlet port.

12. The safety injection tank with the gravity-driven fluidic device according to claim 1, wherein the first flow inlet port is formed at a location around a lowermost surface of the pressure vessel.

* * * * *